US008762769B2

(12) United States Patent
Ledoux et al.

(10) Patent No.: US 8,762,769 B2
(45) Date of Patent: Jun. 24, 2014

(54) DOWNLOADING A DISK IMAGE FROM A SERVER WITH A REDUCED CORRUPTION WINDOW

(75) Inventors: Emmanuel Dimitri Christian Ledoux, Ft. Collins, CO (US); Fletcher Liverance, Kent, OH (US); Timothy J Freese, Niwot, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 13/217,390

(22) Filed: Aug. 25, 2011

(65) Prior Publication Data

US 2013/0055008 A1 Feb. 28, 2013

(51) Int. Cl.
*G06F 11/00* (2006.01)
(52) U.S. Cl.
USPC .......................................... 714/6.12
(58) Field of Classification Search
USPC .......................................... 714/6.12
See application file for complete search history.

(56) References Cited

U.S. PATENT DOCUMENTS

| 5,692,190 | A  | * | 11/1997 | Williams | ................. | 713/2 |
| 6,415,382 | B1 | * | 7/2002  | Kwan     | ................. | 713/2 |
| 6,477,624 | B1 |   | 11/2002 | Kedem et al. | | |
| 6,591,363 | B1 | * | 7/2003  | von Below | ................ | 713/2 |
| 6,715,106 | B1 | * | 3/2004  | Mermelstein | .............. | 714/36 |
| 7,322,029 | B2 | * | 1/2008  | Diaz     | ................. | 717/168 |
| 7,337,309 | B2 | * | 2/2008  | Nguyen et al. | ............ | 713/1 |
| 7,379,982 | B2 |   | 5/2008  | Tabbara  | | |
| 7,757,112 | B2 | * | 7/2010  | Childs et al. | .............. | 714/5.1 |
| 8,122,234 | B1 | * | 2/2012  | Orr      | ................. | 713/2 |
| 8,599,423 | B2 | * | 12/2013 | Ohhashi  | ................. | 358/1.16 |
| 2003/0028800 | A1 | * | 2/2003 | Dayan et al. | ............. | 713/200 |
| 2007/0067679 | A1 | * | 3/2007 | Deobald  | ................. | 714/36 |
| 2009/0172136 | A1 |   | 7/2009 | Schulz et al. | | |
| 2010/0241837 | A1 | * | 9/2010 | Concorso | ................. | 713/2 |

FOREIGN PATENT DOCUMENTS

WO   WO-2006/111457 A1   10/2006

OTHER PUBLICATIONS

How to Manage and Image Thin Clients, Symantec, Article ID: HOWTO1563, Created: Sep. 9, 2005, Updated: Sep. 26, 2007, pp. 1-10, Available at <symantec.com/business/support/index?page=content&id=HOWTO1563>.
IBM Smart Business Desktop Cloud for Full Stream Client, IBM, 2009, pp. 1-4, Available at <935.ibm.com/services/us/gts/pdf/wyse-smart-business-desktop-cloud>.
Jun Kanai et al., "Mobile Thin-Client System with Fault Tolerance and Scalability by" Http-Fuse-Knoppix-Box, Proceedings of PDPTA, 2007, pp. 1-7.

* cited by examiner

*Primary Examiner* — Bryce Bonzo
*Assistant Examiner* — Elmira Mehrmanesh
(74) *Attorney, Agent, or Firm* — Scott Pojunas

(57) ABSTRACT

Example embodiments relate to downloading a disk image from a server while reducing the corruption window. In example embodiments, a computing device writes a recovery image to a portion of a primary storage device. The computing device may then write the disk image to the primary storage device until a portion of the disk image corresponding to the recovery image remains. Next, the computing device may write the remaining portion of the disk image to a secondary storage location. Finally, the computing device may overwrite the recovery image using the remaining portion of the disk image from the secondary storage location.

15 Claims, 4 Drawing Sheets

DOWNLOADING A DISK IMAGE FROM A SERVER WITH A REDUCED CORRUPTION WINDOW

BACKGROUND

A disk image is typically a the that contains the complete contents and structure of a storage medium, such as a hard disk drive, solid state drive, or other storage device. Thus, a disk image generally captures the master boot record (MBR), partitions, and the system of a storage device without requiring additional software to understand and parse specific partition and the system types.

Software developers take advantage of the simplicity offered by disk images in a number of solutions. For example, some backup solutions generate a complete disk image of a storage device, such that the device can later be restored by simply copying the disk image to the device. As another example, an enterprise with a thin client architecture can easily distribute a shared disk image to multiple client devices, thereby reducing the need for client-specific configuration.

BRIEF DESCRIPTION OF THE DRAWINGS

The following detailed description references the drawings, wherein.

DETAILED DESCRIPTION

Figure 1:
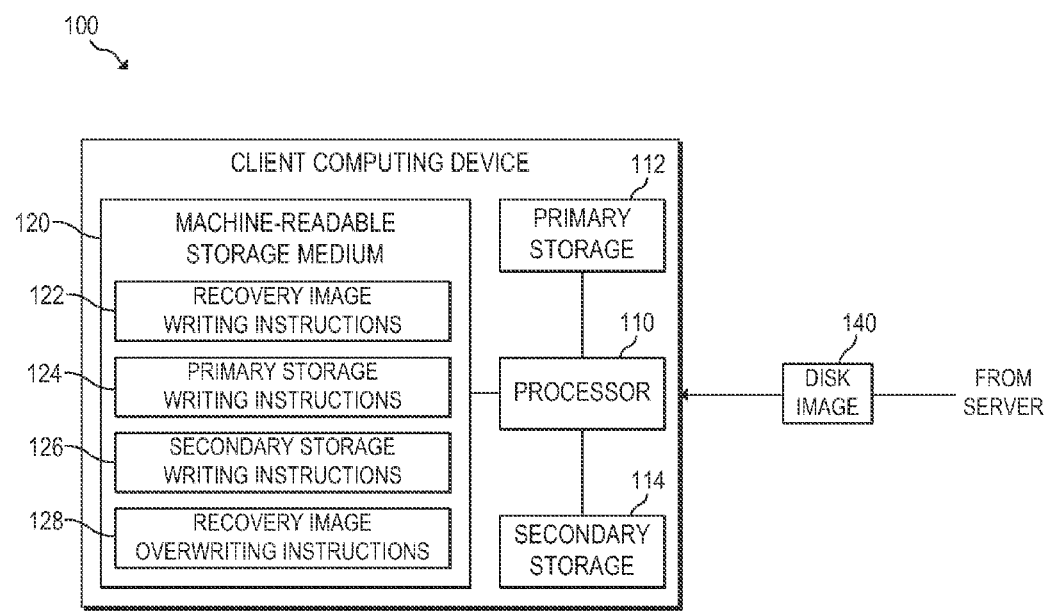
FIG. 1 is a block diagram of an example client computing device for downloading a disk image using a primary storage device and a secondary storage location.

As detailed above, disk images are used to simplify a number of software tasks. In some situations, a disk image is stored on a server and is copied to a client device to accomplish a particular task. For example, some backup solutions store the entire disk image on a server, such that the server may simply transmit the disk image to the client to restore the client device. Similarly, in some thin client architectures, a server stores the disk image and copies the image to a client device to initialize or update the client.

In these server-based solutions, problems can arise if the client loses power or its network connection while receiving a disk image from the server. For example, if such an error occurs while the client is writing the disk image to a local storage device, the storage device may be corrupted. Such an error is particularly problematic when the storage device is writing the master boot record, partition records, or critical operating system (OS) files, as the client will be unable to boot thereafter.

Furthermore, existing solutions fail to reliably download a disk image from a server in a manner that is suitable for devices with limited amounts of RAM or other secondary storage. For example, one possibility is to download the entire disk image to a secondary device prior to copying the disk image to a primary storage device. Problematically, such a solution requires an amount of secondary storage that is at least the size of the disk image. In systems with a limited amount of RAM or other secondary storage, such solutions are not possible.

Example embodiments disclosed herein address these issues by providing a technique for downloading a disk image from a server in a server-agnostic manner that reduces the time window for possible disk corruption, even in systems with a limited amount of secondary storage. For example, upon initialization of the disk image downloading process, a computing device may write a recovery image to a portion of a primary storage device, which may be the storage device that is the target of the disk image download. The computing device may then begin downloading the disk image and writing the downloaded disk image to the primary storage device until a portion of the disk image corresponding to the recovery image remains. Next, the computing device may write the remaining portion of the disk image to the secondary storage location, such that the recovery image is temporarily maintained while the remainder of the image is downloaded. Finally, the computing device may overwrite the recovery image using the remaining portion of the disk image from the secondary storage location.

In this manner, example embodiments disclosed herein allow for a device to stream a disk image from a server, while significantly reducing the time window during which the device can be corrupted. In particular, by creating a recovery image and temporarily writing a portion of the disk image to a secondary storage location, example embodiments reduce the potential window for corruption to the time required to overwrite the recovery image with the data from the secondary storage location. Furthermore, because the amount of secondary storage used is limited to the size of the recovery image, example embodiments allow for installation of very large disk images using a relatively small amount of RAM or other secondary storage.

Referring now to the drawings, FIG. 1 is a block diagram of an example client computing device 100 for downloading a disk image 140 using a primary storage device 112 and a secondary storage location 114. Client computing device 100 may be, for example, a notebook computer, a desktop computer, an all-in-one system, a thin client, a workstation, a tablet computing device, a mobile phone, or any other computing device suitable for execution of the functionality described below. In the implementation of FIG. 1, client computing device 100 includes processor 110, primary storage device 112, secondary storage location 114, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to implement the procedure for downloading a disk image from a server, as described below. As an alternative or in addition to retrieving and executing instructions, processor 110 may include one or more electronic circuits comprising a number of electronic components for performing the functionality of one or more of instructions 122, 124, 126, 128.

Primary storage device 112 may be any storage device suitable for storage of a disk image 140 obtained from a server. For example, primary storage device 112 may be a hard disk drive, a solid state drive, a hybrid drive including both rotating media and non-volatile memory, flash memory, or any other type of storage device. Primary storage device 112 may be installed internally within client 100 or may instead be coupled to client 100 via an external bus. Regardless of the particular implementation, primary storage device 112 may be the target device for receiving a disk image 140 from a server, as described in further detail below.

Secondary storage location 114 may be any storage location suitable for temporary storage of a portion of the disk image 140. Thus, secondary storage location 114 may be a storage device that is separate from primary storage device 112, such as an additional storage drive, a flash memory device, Random Access Memory (RAM), or a similar device. Alternatively, secondary storage location 114 may be a location within primary storage device 112 that is separate from the location used for storage of disk image 140. The process for using secondary storage location 114 to temporarily store a portion of disk image 140 is described below in connection with instructions 126, 128.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. In some implementations, storage medium 120 may be the same device as primary storage 112 and/or secondary storage 114. As described in detail below, machine-readable storage medium 120 may be encoded with executable instructions for downloading a disk image from a server.

The instructions encoded on storage medium 120 may be executed upon initialization of a routine for downloading disk image 140 from a server. For example, instructions 122, 124, 126, 128 may be executed by a backup application to restore a disk image previously archived on the server. As another example, instructions 122, 124, 126, 128 may be executed by an application running on a thin client for downloading an initial or updated shared disk image stored on the server. Each of these applications may execute within the primary OS of client 100 or, alternatively, within a dedicated OS environment for managing the download process.

Regardless of the implementation, disk image 140 may be a file or set of files containing the complete contents and structure of a given storage device, such as a hard disk drive, solid state drive, hybrid drive, flash memory device, or optical disc. In other words, disk image 140 may be a sector-by-sector copy of the storage device and may therefore represent the data as it is stored on the storage device, including any partition and file system information. In some embodiments, disk image 140 may be compressed using a compression algorithm, such that client 100 decompresses the image as part of the downloading process.

Upon initiation of the instructions on storage medium 120, recovery image writing instructions 122 may write a recovery image to a portion of the primary storage device 112. The recovery image may include any set of instructions suitable for resuming, reversing, or otherwise troubleshooting the disk image download process in the event that the process is interrupted by a power failure, network failure, or other error. As one example implementation, the recovery image may include a system kernel, core system initialization foes, and a limited-functionality OS that continues the process for downloading disk image 140 in an environment separate from the primary OS of client 100. The recovery image may also include other files used to download disk image 140, such as storage and network drivers.

In some embodiments, writing instructions 122 may set client 100 to boot into the recovery image prior to initiating the process for writing chunks of the disk image to primary storage device 112. For example, writing instructions 122 may write the recovery image to the beginning portion of primary storage device 112, which may start with the first sector, the typical location of the Master Boot Record (MBR). In this manner, the Basic Input/Output System (BIOS) of client 100 may automatically trigger the recovery image at power-on of client 100. As a result, when downloading disk image 140 from the server fails, client 100 may access the recovery image to boot into a recovery mode for continuing, reversing, or otherwise troubleshooting the process for downloading the disk image.

After the recovery image is in place, primary storage writing instructions 124 may then initiate the download process by receiving data chunks of disk image 140 from the server via a network interface of client 100. Each data chunk may be a portion of the disk image of any size. As chunks are downloaded from the server, writing instructions 124 may decompress the chunks as necessary and then write the chunks to a corresponding location in primary storage device 112. As a result, writing instructions 124 may perform a sector-by-sector duplication of disk image 140 on primary storage device 112.

To avoid overwriting the recovery image written by instructions 122, primary storage writing instructions 124 may stop writing to primary storage device 112 when a portion of disk image 140 corresponding to the recovery image remains. For example, primary storage writing instructions 124 may determine the total size of the recovery image and stop writing disk image 140 to primary storage device 112 when a portion of disk image 140 corresponding in size to the recovery image remains. To give a more specific example, when the recovery image is written to the beginning of primary storage device 112, writing instructions 124 may begin with the last chunk of disk image 140 and proceed toward the beginning of disk image 140 until reaching the last chunk of the recovery image.

After primary storage writing instructions 124 have written all data of disk image 140 except the data corresponding to the recovery image, client 100 may then execute secondary storage writing instructions 126. Secondary storage writing instructions 126 may continue to download and write the data chunks of the remaining portion of disk image 140 to secondary storage location 114 until all chunks of disk image 140 have been downloaded from the server. As detailed above, secondary storage location 114 may be a location on primary storage device 112 separate from the area used to store disk image 140 or, alternatively, may be a location on a separate storage device. As a result, as the remaining portion of disk image 140 is downloaded to a local storage location, the recovery image initially written to primary storage 112 remains intact.

Finally, after all remaining data of disk image 140 has been downloaded to secondary storage location 114, client 100 may trigger recovery image overwriting instructions 128. Overwriting instructions 128 may read the remaining portion of disk image 140 from secondary storage location 114, decompress the data as necessary, and then write the data to the portion of primary storage device 112 occupied by the recovery image. As detailed above, the remaining portion of disk image 140 may correspond in size to the recovery image, so overwriting instructions 128 may complete the local copy of disk image 140 by simply writing all remaining data chunks of disk image 140 from secondary storage location 114 to primary storage device 112.

By executing instructions 122, 124, 126, 128 as described above, client 100 may significantly reduce the time window for possible corruption of the disk image. In particular, primary storage device 112 is only susceptible to corruption during the brief period in which overwriting instructions 128 overwrite the recovery image using the data in secondary storage location 114. Should a failure occur at any other time, client 100 may simply execute the recovery image to continue, reverse, or otherwise troubleshoot the download of disk image 140.

Figure 2:
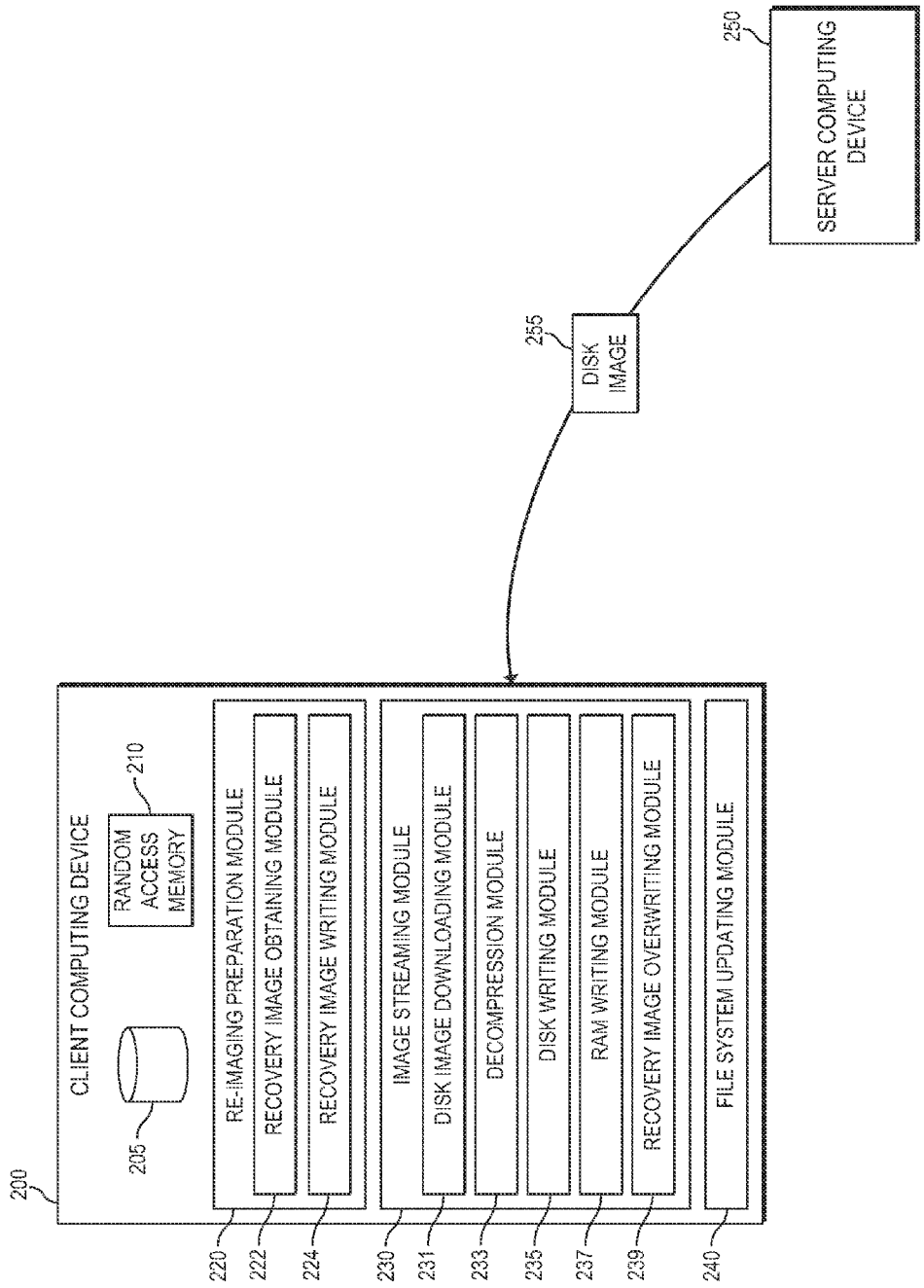
FIG. 2 is a block diagram of an example client computing device for downloading a disk image from a server using a storage drive and Random Access Memory (RAM)

FIG. 2 is a block diagram of an example client computing device 200 for downloading a disk image 255 from a server 250 using a storage drive 205 and Random Access Memory (RAM) 210. As illustrated in FIG. 2 and described below, client device 200 may be in communication with a server computing device 250 to download a disk image 255 using a plurality of modules 220-240.

As illustrated, client computing device 200 may include a storage drive 205 that is the target of the disk image 255 to be downloaded from server computing device 250. Although illustrated and described as a storage drive, storage drive 205 may be any type of storage device, such as one of the storage devices described above in connection with primary device 112. Client 200 may also include RAM 210, which may be used for temporarily storing a portion of disk image 255. RAM 210 may be replaced with any other storage device suitable for temporary storage of the portion of disk image 255.

Client computing device 200 may also include a number of modules 220-240 for downloading disk image 255 in a manner that minimizes the potential for corruption of storage drive 205. Each of the modules may include a series of instructions encoded on a machine-readable storage medium of client 200 and executable by a processor of client 200. In addition or as an alternative, each module may be one or more hardware devices including electronic circuitry for implementing the functionality described below.

Re-imaging preparation module 220 may be responsible for preparing client device 200 for re-imaging of storage drive 205 using disk image 255. Upon receipt of an indication that client 200 is to download a disk image 255 from a server 250, module 220 may first confirm that disk image 255 exists on server 250 and is properly sized. If the re-imaging is to occur within the OS of client 200, module 220 may also shut down non-critical system services and mount the file system into RAM, such that the OS does not write to disk blocks to be reimaged during the re-imaging procedure. After performing these initial processes, re-imaging preparation module 220 may then trigger recovery image obtaining module 222 and recovery image writing module 224.

Recovery image obtaining module 222 may be responsible for obtaining a recovery image to be used in the event that the download of disk image 255 fails. In some implementations, obtaining module 222 may generate the recovery image using data present on storage drive 205. For example, module 222 may bundle the kernel, core system files, and an application for managing the recovery process into a recovery file. In other implementations, obtaining module 222 may download the entire recovery image or a portion thereof from the server 205. Recovery image writing module 224 may then write the recovery image to an appropriate location within storage drive 205. For example, as described above in connection with writing instructions 122, writing module 224 may write the recovery image to the beginning of storage drive 205 and set client 200 to boot into the recovery package contained within the image.

After module 220 prepares the system for re-imaging, image streaming module 230 may then initialize the process for downloading disk image 255 from server 250 to storage drive 205. In particular, disk image downloading module 231 may initialize input and output streams to be used for reading and writing data chunks. For example, downloading module 231 may initialize a network socket for obtaining data chunks of disk image 255 from server 250, initialize decompression module 233 for decompressing the downloaded chunks, and initialize disk writing module 235 and RAM writing module 237 for writing the chunks to storage drive 205 and RAM 210, respectively.

In operation, disk image downloading module 231 may obtain a data chunk of disk image 255 from server 250 and trigger either disk writing module 235 or RAM writing module 237 depending on the state of the download. In particular, decompression module 233 may decompress incoming data chunks of disk image 255 and disk writing module 235 may write the decompressed chunks to storage drive 205 until a portion of disk image 255 equal in size to the recovery image remains. Then, RAM writing module 237 may write the remaining compressed chunks of disk image 255 to RAM 210 until the entire disk image 255 is downloaded. Finally, decompression module 233 may decompress the remaining data chunks stored in RAM 210 and recovery image overwriting module 239 may then write the decompressed chunks to the portion of storage drive 205 occupied by the recovery image.

When the entirety of disk image 255 is successfully written to storage drive 205, file system updating module 240 may finalize the download. For example, updating module 240 may update the file system of storage drive 205 so that client 200 boots using the newly-downloaded disk image. Updating module 240 may also write configuration information to storage drive 205, such as a file containing the image name, size, and a file signature. Finally, updating module 240 may reboot client 200, such that client 200 boots using the operating system contained on the new disk image.

Figure 3:
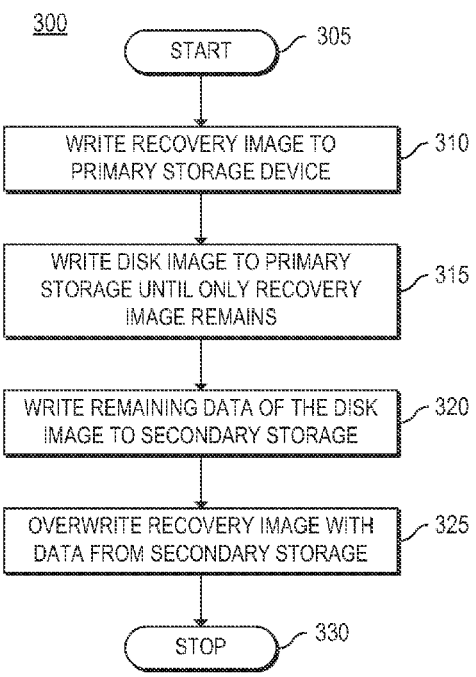
FIG. 3 is a flowchart of an example method for downloading a disk image from a server by temporarily writing a portion of the downloaded disk image to a secondary storage location.

FIG. 3 is a flowchart of an example method 300 for downloading a disk image from a server by temporarily writing a portion of the downloaded disk image to a secondary storage location. Although execution of method 300 is described below with reference to client computing device 100, other suitable components for execution of method 300 will be apparent to those of skill in the art (e.g., client computing device 200). Method 300 may be implemented in the form of executable instructions stored on a machine-readable storage medium, such as storage medium 120, and/or in the form of electronic circuitry.

Method 300 may start in block 305 and proceed to block 310, where client 100 may receive an instruction to initiate a download of a disk image 140 and may therefore write a recovery image to primary storage device 112. As detailed above, the recovery image may include any set of instructions suitable for resuming, reversing, or otherwise troubleshooting the disk image download. After writing the recovery image, client 100 may set itself to boot into the recovery image in the event that the download of disk image 140 fails.

Next, in block 315, client 100 may begin downloading disk image 140 from the server and writing disk chunks to primary storage 112. Client 100 may continue downloading and writing chunks of disk image 140 to primary storage 112 until only a portion corresponding to the recovery image remains. For example, client 100 may continue to write to primary storage 112 until the amount of remaining data of disk image 140 is equal in size to the size of the recovery image.

Then, in block 320, client 100 may switch writes of the chunks from primary storage device 112 to secondary storage location 114. In particular, client 100 may write the chunks received from the server to secondary storage location 114 until all chunks have been downloaded from the server. Finally, in block 325, client 100 may overwrite the recovery image stored in primary storage 112 using the chunks temporarily stored in secondary storage location 114. Method 300 may then stop in block 330.

Figure 4:
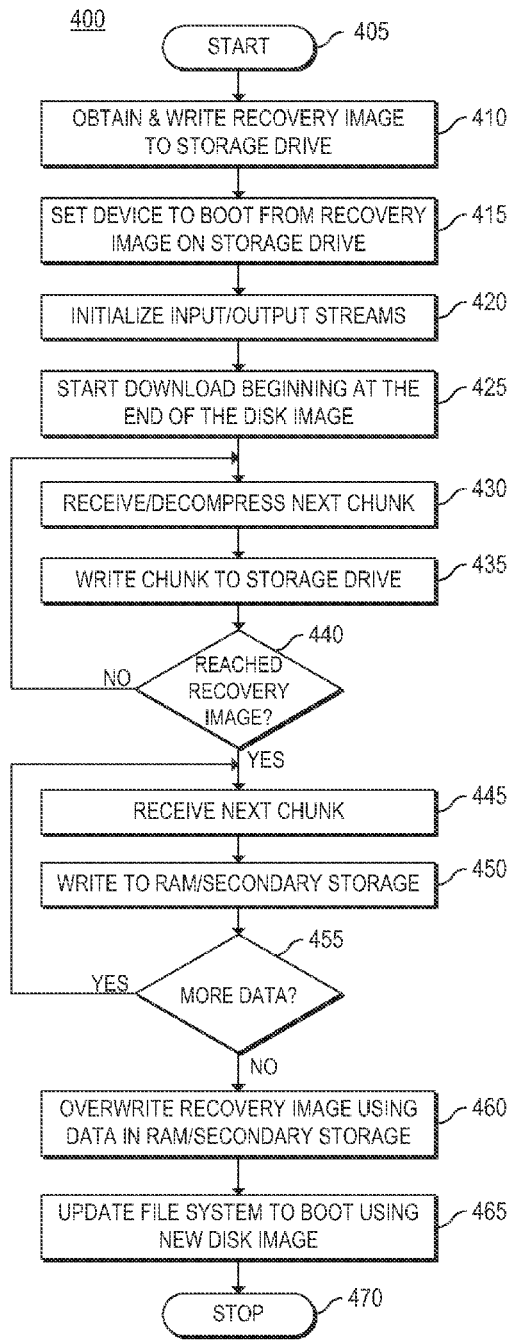
FIG. 4 is a flowchart of an example method for downloading a disk image from a server by starting the download from a last chunk of the disk image and proceeding toward a recovery image.

FIG. 4 is a flowchart of an example method 400 for downloading a disk image 255 from a server 250 by starting the download from a last chunk of the disk image and proceeding toward a recovery image. Although execution of method 400 is described below with reference to client computing device 200, other suitable components for execution of method 400 will be apparent to those of skill in the art. Method 400 may be implemented in the form of executable instructions stored on a machine-readable storage medium and/or in the form of electronic circuitry.

Method 400 may start in block 405 and proceed to block 410, where client 200 may receive an instruction to download a disk image 255 from a server 250 and may therefore generate or otherwise obtain a recovery image. Client 200 may generate the recovery image using local files and/or download the recovery image from server 250. After obtaining the recovery image, client 200 may then write the recovery image to storage drive 205. For example, client 200 may write the recovery image to a beginning portion of storage drive 205. In block 415, client 200 may then set itself to boot from the recovery image on storage drive 205. For example, client 200 may write a new bootloader, modify the MBR to point to the root of the recovery image, or modify the file system.

After the recovery image is in place, method 400 may proceed to block 420, where client 200 may initialize the input and output streams to be used to download and write disk image 255. For example, client 200 may initialize a network socket to receive chunks of disk image 255 from server 250, a decompression module for decompressing the chunks, and write modules for writing the chunks to either storage drive 205 or RAM 210.

In block 425, client 200 may initiate the download of disk image 255 beginning with the last chunk of disk image 255. Thus, in block 430, client 200 may receive the next chunk of disk image 255 and decompress the chunk. In block 435, client 200 may then write the decompressed chunk to primary storage 205 starting at the end of the image. For example, client 200 may calculate the total size of disk image 255 and start writes at the offset of the beginning of the recovery image in storage drive 205 plus the total size of the disk image. Client 200 may then iteratively execute blocks 430 and 435, proceeding toward the beginning of the image in the direction of the recovery image until it is determined in block 440 that the next chunk on storage drive 205 is the last chunk of the recovery image.

Method 400 may then proceed to block 445, where client 200 may continue receiving the chunks of disk image 255. In block 450, client 200 may direct writes to RAM 210 or another secondary storage location, rather than storage drive 205. Client 200 may then continue receiving chunks in block 445 and writing the chunks to RAM 210 until it is determined in block 455 that the entire disk image 255 has been downloaded from server 250.

After the remaining chunks of disk image 255 have been written to RAM 210, method 400 may proceed to block 460, where client 200 may overwrite the recovery image using the data of disk image 255 stored in RAM 210. For example, client 200 may retrieve the chunks of data from RAM 210, decompress the chunks, and write the decompressed chunks to the beginning portion of storage drive 205, thereby overwriting the recovery image. Finally, in block 465, client 200 may update the file system to boot using the newly-downloaded disk image, such that subsequent boots of client 200 use the operating system contained in the disk image. Method 400 may then stop in block 470.

Figure 5:
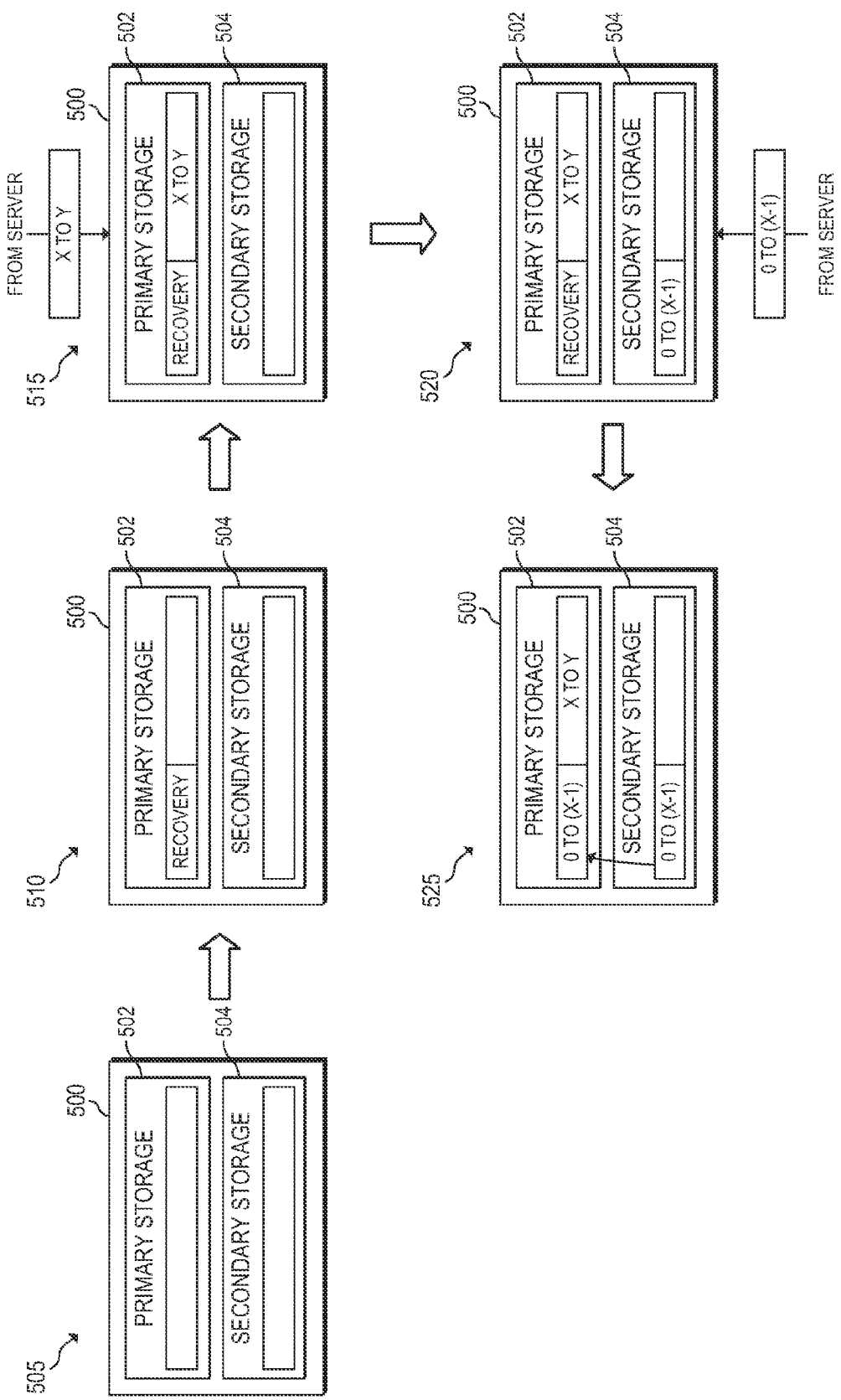
FIG. 5 is a block diagram of an example sequence of operations for downloading a disk image from a server.

FIG. 5 is a block diagram of an example sequence of operations for downloading a disk image from a server. As illustrated, client computing device 500 includes primary storage 502 and secondary storage 504, both of which are used for storage in various parts of the downloading process. Note that FIG. 5 is intended to depict the data as downloaded and written during the disk image downloading process and that storage devices 502, 504 may therefore include additional data not illustrated in FIG. 5.

At state 505, primary storage 502 and secondary storage 504 are ready for the image downloading process. Next, at state 510, client 500 generates and writes a recovery image to primary storage 502, which includes X total chunks. Client 500 then configures itself to boot from the recovery image and begins the download process.

At state 515, client 500 begins downloading the disk image from the server and, in particular, downloads chunks X to Y and writes these chunks to primary storage 502. In some embodiments, client 500 may begin by downloading chunk Y and may then proceed in the reverse direction toward chunk X. As illustrated in state 515, primary storage 502 now includes the recovery image and chunks X to Y, which are, in combination, equal to the total size of the disk image. At state 520, client 500 continues the download process, but instead writes the remaining chunks, chunks 0 to X−1, to secondary storage 504. As a result, at state 520, client 500 has downloaded the entire disk image from the server, but the recovery image has remained intact in primary storage 502.

Finally, to complete the process, client 500 copies chunks 0 to X−1 from secondary storage 504 to primary storage 502, thereby overwriting the recovery image, Client 500 may then discard the blocks in secondary storage 504 or indicate that these blocks may be overwritten as necessary. As illustrated in state 525, at the conclusion of the process, primary storage 502 includes the entire disk image (i.e., chunks 0 to Y) and client 500 is therefore ready to use the disk image as appropriate.

The foregoing disclosure describes a number of example embodiments for downloading a disk image from a server. The disclosed embodiments significantly increase the reliability of downloading a disk image from a server by reducing the time period in which the target storage device can be corrupted. In particular, as described in detail above, the use of a recovery image and a secondary storage location reduce the potential window for corruption to the time required to overwrite the recovery image. Furthermore, this technique is effective in significantly reducing the corruption window, even when downloading very large disk images to systems with a limited amount of RAM or other secondary storage. Additional embodiments and advantages of such embodiments will be apparent to those of skill in the art upon reading and understanding the foregoing description.

We claim:

1. A computing device for downloading a disk image from a server with a reduced corruption window, the computing device comprising:
 a primary storage device to store the disk image from the server;
 a secondary storage location; and
 a processor to:

write a recovery image to a portion of the primary storage device,
write data chunks of the disk image downloaded from the server to the primary storage device until a portion of the disk image corresponding to the recovery image remains unwritten to the primary storage device,
write data chunks, corresponding to the portion of the disk image which remains unwritten to the primary storage device, to the secondary storage location until all chunks of the disk image have been downloaded from the server, and
overwrite the recovery image with the remaining data chunks of the disk image from the secondary storage location.

2. The computing device of claim 1, wherein the primary storage device is a storage drive and the secondary storage location is Random Access Memory (RAM).

3. The computing device of claim 1, wherein, to obtain the recovery image, the processor is configured to:
generate the recovery image using data present on the primary storage device, or
download the recovery image from the server.

4. The computing device of claim 1, wherein, when downloading the disk image fails, the processor is further configured to access the recovery image to boot the computing device into a recovery mode.

5. The computing device of claim 4, wherein the processor is configured to set the computing device to boot into the recovery mode prior to writing data chunks of the disk image to the primary storage device.

6. The computing device of claim 1, wherein the processor is further configured to:
write the recovery image to a beginning portion of the primary storage device, and
write the data chunks of the disk image to the primary storage device starting with a last chunk of the disk image and proceeding toward the beginning of the disk image until reaching a last chunk of the recovery image.

7. The computing device of claim 1, wherein:
the disk image to be downloaded from the server is compressed, and
the processor is configured to decompress the data chunks prior to writing the data chunks to the primary storage device.

8. The computing device of claim 1, wherein the processor is further configured to:
update a file system of the primary storage device to boot the computing device using the downloaded disk image.

9. A machine-readable storage medium encoded with instructions executable by a processor of a computing device for downloading a disk image from a server with a reduced corruption window, the machine-readable storage medium comprising:
instructions for writing a recovery image to a recovery portion of the primary storage device;
instructions for writing the disk image received from the server to the primary storage device until a portion of the disk image corresponding in size to the recovery image remains unwritten to the primary storage device;
instructions for writing the portion of the disk image received from the server corresponding to the portion of the disk image which remains unwritten to the primary storage device, to a secondary storage location; and
instructions for overwriting the recovery image by copying the remaining portion of the disk image from the secondary storage location to the recovery portion of the primary storage device.

10. The machine-readable storage medium of claim 9, wherein the primary storage device is a storage drive and the secondary storage location is RAM.

11. The machine-readable storage medium of claim 9, wherein:
the instructions for writing the recovery image are configured to write the recovery image to a beginning portion of the primary storage device; and
the instructions for writing the disk image are configured to write the disk image to the primary storage device starting with a last chunk of the disk image and proceeding toward the beginning of the disk image until reaching a last chunk of the recovery image.

12. The machine-readable storage medium of claim 9, wherein:
the disk image to be downloaded from the server is compressed, and
the machine-readable storage medium further comprises instructions for decompressing chunks of the disk image received from the server.

13. A method for execution by a computing device for downloading a disk image from a server with a reduced corruption window, the method comprising:
writing a recovery image to a primary storage device, the recovery image enabling the computing device to boot into a recovery mode when downloading the disk image fails;
writing data chunks of the disk image received from the server to the primary storage device beginning with a last chunk of the disk image and proceeding until reaching a last chunk of the recovery image such that chunks of the recovery image remain unwritten to the primary storage device;
writing the remaining chunks of the disk image to a secondary storage location; and
overwriting the recovery image on the primary storage device with the remaining chunks of the disk image from the secondary storage location.

14. The method of claim 13, wherein the primary storage device is a storage drive and the secondary storage location is RAM.

15. The method of claim 13, wherein:
the disk image to be downloaded from the server is compressed, and
the method further comprises decompressing data chunks of the disk image prior to writing the data chunks to the primary storage device.

* * * * *